March 13, 1934. J. W. LEIGHTON 1,951,247
STEERING GEAR FOR MOTOR VEHICLES
Filed Nov. 28, 1932 2 Sheets-Sheet 1
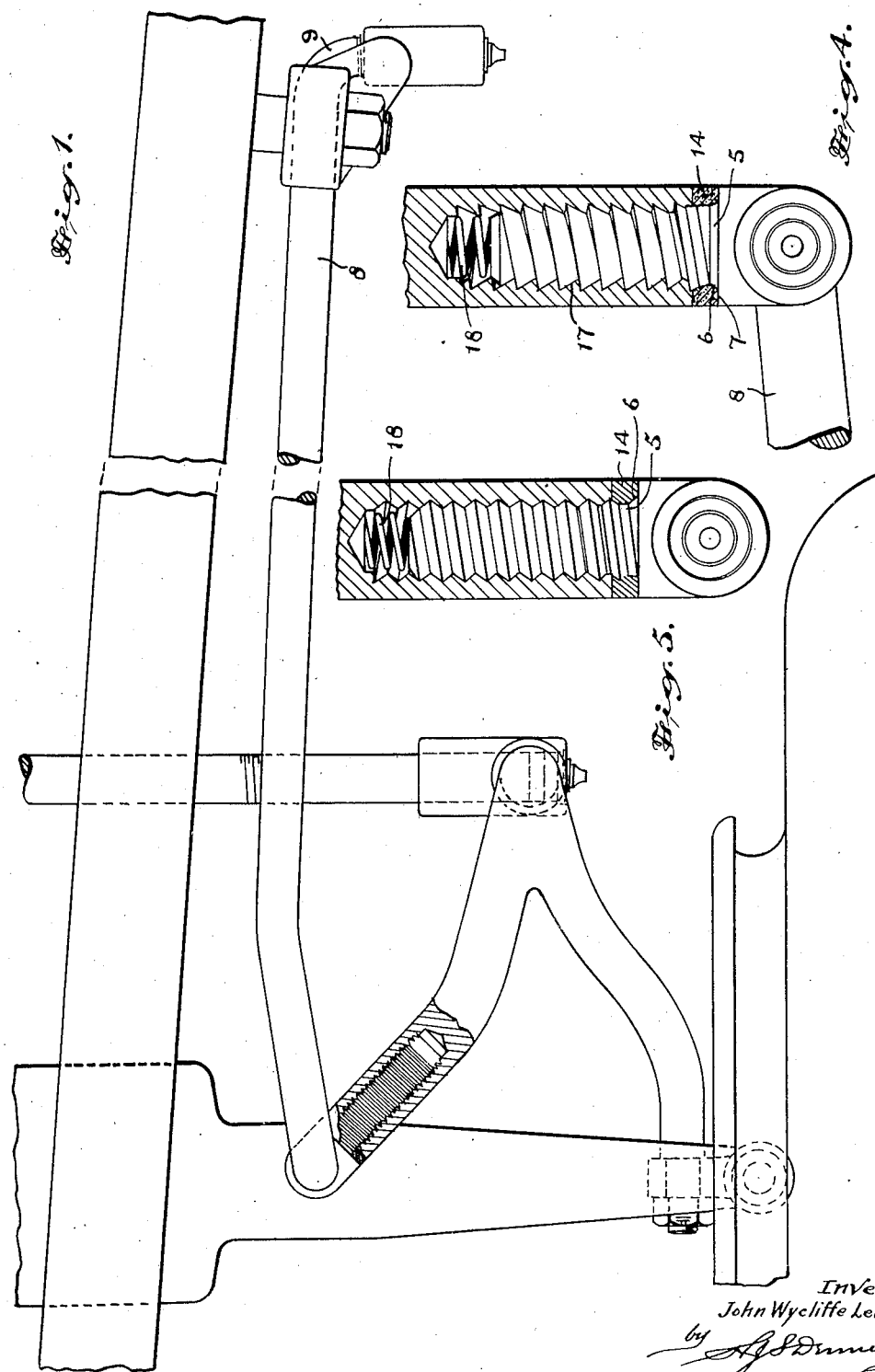
Inventor:
John Wycliffe Leighton
by A.J.S.Dennison
atty

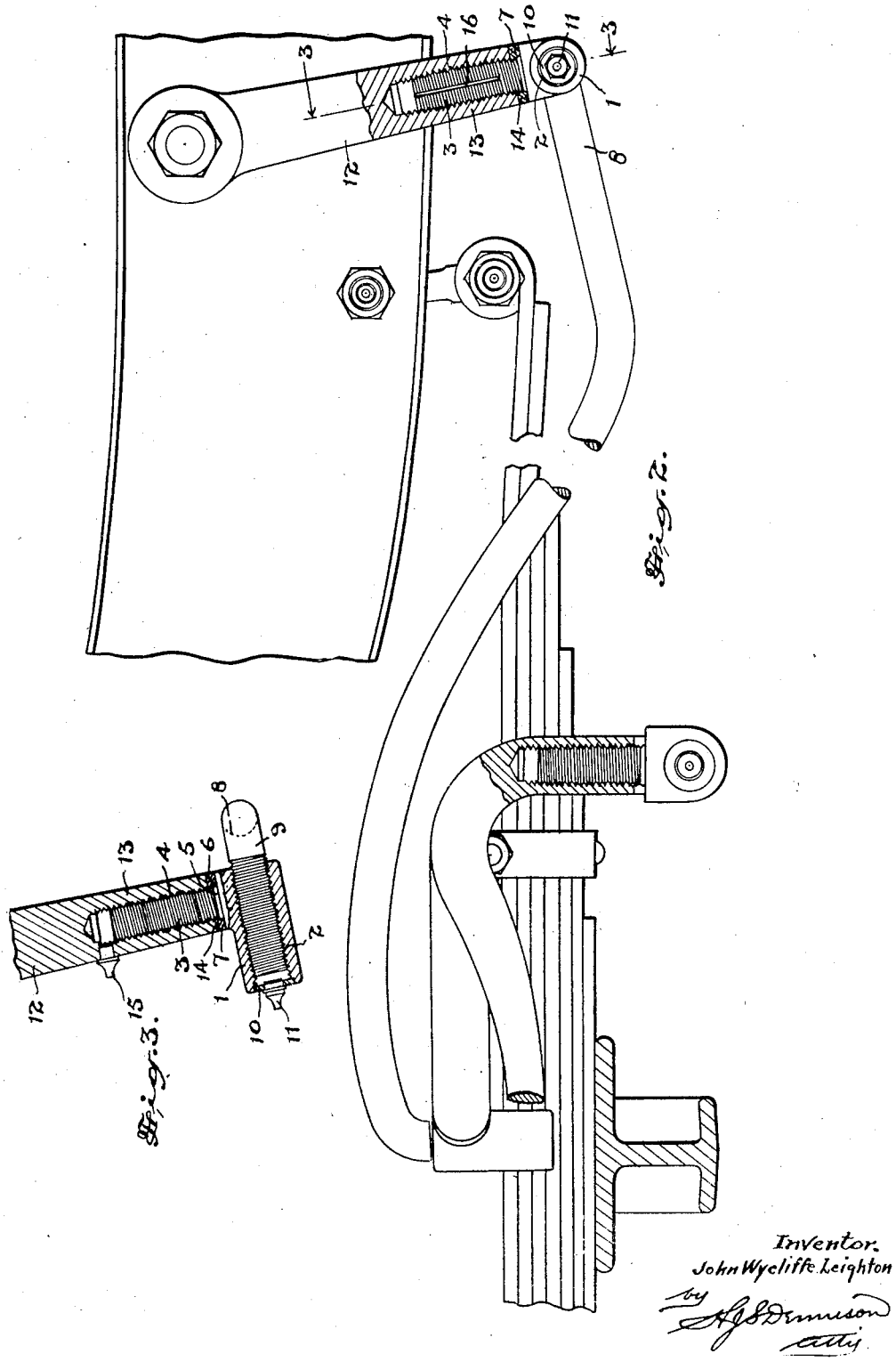

Patented Mar. 13, 1934

1,951,247

UNITED STATES PATENT OFFICE 1,951,247

STEERING GEAR FOR MOTOR VEHICLES

John Wycliffe Leighton, Port Huron, Mich.

Application November 28, 1932, Serial No. 644,646

5 Claims. (Cl. 287—93)

The principal objects of this invention are to provide a joint connection particularly applicable for use in connecting the several arms and rods forming the steering gear connections of a motor vehicle, which will maintain the adjustment of the parts, which will retain its lubrication for an extraordinary period of time and which will possess remarkable freedom from wear.

A still further object is to devise a highly efficient and reliable joint which will be of simple construction and may be manufactured at remarkably low cost.

The principal feature of the invention consists in the novel construction and arrangement of a rigid angularly formed member, each arm of which is threaded to engage a correspondingly threaded rod or arm, the engaging threaded surfaces being rotatable the one on the other.

In the accompanying drawings, Figure 1 is a plan view in part section of a portion of a motor vehicle steering gear to which this invention is applied.

Figure 2 is a side elevational view in part section of the structure shown in Figure 1.

Figure 3 is a sectional detail of the joint connection between the steering gear lever and the drag link taken on the line 3—3 of Figure 2.

Figure 4 is an enlarged sectional detail of a slightly modified form of threaded bearing for the joint members.

Figure 5 is an enlarged sectional detail similar to Figure 4 showing the preferred form of thread.

In the construction of joint shown in detail in Figure 3, a rigid metal block, preferably of forged steel, is formed with a tubular portion 1 which is provided with an internal threaded surface 2 and extending at an angle from said tubular portion is a stud 3 which is threaded externally with a thread 4. The threaded surface of the stud is preferably flared at the base end 5 to a bevelled surface 6 leading to a shoulder 7.

A rod 8, which it is desired to connect with the threaded tubular portion of the joint, is provided with an angularly bent end 9, the extremity of which is threaded to engage the threaded surface 2 of the tubular member, the threads being a snug turning fit. The end of the tubular member, opposite to that into which the threaded rod is inserted is preferably closed by a disc 10 which is fitted with a suitable lubricant fitting 11 which permits the insertion of lubricant into the "blind" end of the tube.

A rod or lever 12, which is to be connected with the rod 8 by the joint is formed with an internally threaded socket 13 extending thereinto from the end and the stud 3 is threaded thereinto, the threads being a snug turning fit. A dust washer 14 of felt or other suitable material encircles the stud 3 and engages the shoulder 7 and the end of the rod or lever 12. A suitable fitting 15 is arranged in the lever 12 to direct lubricant into the "blind" end of the threaded socket 13.

It will be readily understood that the threaded end of the rod 8 may swivel freely in its threaded bearing in the tubular portion of the block and the stud 3 of the block may swivel freely in the threaded end of the lever 12 and the lever may thus swing on its pivot and operate the rod 8 with a "universal" movement, and a long threaded bearing surface is provided for each member.

These bearing surfaces will be suitably heat-treated to render them wear-resisting and as lubricant is imprisoned in the "blind" end of each socket it will lubricate the thread bearing surfaces with the maximum efficiency.

The several joints of a motor vehicle steering mechanism are all capable of being made in a manner similar to that described and the structure provides a thoroughly flexible joint which retains its lubricant, and which has the maximum of bearing surfaces which are, as will be readily appreciated, practically impervious to the ingress of dust and foreign matter which so quickly cuts away the bearing surfaces in the ordinary ball and socket joints.

It may be found desirable to apply some pressure to the bearing thread surfaces to take up what slight wear there will be and this may be accomplished by providing the internal members with longitudinal slots 16 and spreading the ends slightly before they are hardened.

In Figure 4 the mating threaded members are shown formed with a "buttress" thread and the taper surfaces 17 are held in close bearing contact by a compression spring 18 inserted in the "blind" end which will avoid any looseness occurring through wear.

It is found in practice that the preferable form of thread for the bearing surfaces of a joint such as described is that with its surfaces disposed at an obtuse angle. In this arrangement the resultant force with the inclined thread surfaces is not sufficient to overcome the force exerted by the end spring and thus allow freedom of movement of the threads to cause rattle.

What I claim as my invention is:—

1. In a steering gear for motor vehicles, a swingable member having a threaded surface at the end arranged longitudinally thereof, a rigid right angular member having a threaded bearing surface engaging the threaded surface of said swingable member in oscillative contact and a threaded bearing surface at right angles thereto, and a rod having a bent end arranged with its extremity engaging the second threaded surface of the rigid right angular member, said swingable member, rigid right-angular member, and said rod being retained in their co-operatively coupled relation solely by the threaded bearing engagement thereof.

2. In a steering gear for motor vehicles, a swingable member having threaded socket in the end, a block having a threaded stud oscillatably journalled in said socket and having a right angularly disposed threaded socket, and a swingable member having a right angularly bent end threaded and inserted in bearing engagement with the threaded socket of said block, the threaded bearing contact of said block with the respective swingable members serving as the sole means of retaining said respective members in their co-operatively coupled relation.

3. In a steering gear for motor vehicles, a joint comprising a right angular member having threaded surfaces extending longitudinally of each portion thereof, a rod having an endwise threaded portion oscillatably engaging one of the threaded portions of said right angular member, and a rod having an angularly turned end formed with a threaded surface engaging the threaded bearing surface of the other portion of the right angular member, the entire complement of members being retained in their co-operatively assembled relation solely by the threaded bearing engagement presented therebetween.

4. In a steering gear for motor vehicles, a swingable member having a threaded socket in the end, a block having a threaded surface oscillatably engaging the threaded wall of the socket in threaded bearing contact and having a right angularly disposed threaded socket, and a swingable member having a right angularly bent threaded end accommodated in said socket in threaded oscillative bearing engagement with the thread thereof, the threaded bearing contact of said block with the respective swingable members serving as the sole means of retaining said respective members in their co-operating coupled relation.

5. In a steering gear for motor vehicles, a swingable member having a threaded socket in the end, a block having a threaded surface oscillatably engaging the threaded wall of the socket in threaded bearing contact and having a right angularly disposed threaded bearing surface, and a swingable member having a right angularly disposed threaded bearing surface engaging the right angularly disposed threaded bearing surface of said block in oscillative threaded bearing contact, the said threaded bearing contact of said block with the respective swingable members serving as the sole means of retaining said respective members in their co-operating coupled relation.

JOHN WYCLIFFE LEIGHTON.